(12) United States Patent
Schrum

(10) Patent No.: US 9,898,488 B2
(45) Date of Patent: Feb. 20, 2018

(54) PRESERVING DEPRECATED DATABASE COLUMNS

(71) Applicant: Oracle International Corporation, Redwood Shores, CA (US)

(72) Inventor: Allan George Schrum, Bozeman, MT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 425 days.

(21) Appl. No.: 14/557,085

(22) Filed: Dec. 1, 2014

(65) Prior Publication Data

US 2016/0154829 A1 Jun. 2, 2016

(51) Int. Cl.
*G06F 17/30* (2006.01)

(52) U.S. Cl.
CPC .. *G06F 17/30297* (2013.01); *G06F 17/30371* (2013.01)

(58) Field of Classification Search
CPC ......... G06F 17/30371; G06F 17/30297; G06F 17/30294; G06F 17/30598; G06F 17/30595; G06F 8/65; G06F 8/71; G06F 17/30; G06F 9/4446; G06F 17/30345; G06F 17/30312; G06F 17/3089; G06F 17/30377; G06C 30/0277; H04L 41/082
See application file for complete search history.

(56) References Cited

U.S. PATENT DOCUMENTS

| | | | | |
|---|---|---|---|---|
| 7,117,504 B2* | 10/2006 | Smith | ....................... | G06F 8/20 709/201 |
| 8,346,929 B1* | 1/2013 | Lai | ......................... | G06Q 10/10 709/226 |
| 8,819,068 B1* | 8/2014 | Knote | ............... | G06F 17/30339 707/790 |
| 2002/0112058 A1* | 8/2002 | Weisman | .............. | G06F 9/4411 709/227 |
| 2006/0004686 A1* | 1/2006 | Molnar | ............. | G06F 17/30297 707/E17.005 |
| 2006/0085465 A1* | 4/2006 | Nori | ................... | G06F 17/30297 707/E17.005 |
| 2006/0123016 A1* | 6/2006 | Ashok | ............... | G06F 17/30566 707/E17.014 |
| 2006/0213975 A1* | 9/2006 | Krishnan | ............... | G06Q 20/02 235/380 |
| 2008/0098037 A1* | 4/2008 | Neil | .................. | G06F 17/30297 707/E17.005 |

(Continued)

*Primary Examiner* — Anh Ly
(74) *Attorney, Agent, or Firm* — Kilpatrick Townsend & Stockton LLP

(57) ABSTRACT

A method of preserving deprecated database columns across application upgrades may include maintaining a database communicatively coupled to an application. The application may include a first schema. The first schema may indicate a first column for the database. The method may also include receiving an update for the application. The update may include a second schema that removes the first column from the database. The method may additionally include renaming the first column by appending a prefix to a name of the first column. The prefix may indicate that the first column is deprecated. The method may further include maintaining the first column in the database.

20 Claims, 10 Drawing Sheets

(56) References Cited

U.S. PATENT DOCUMENTS

| | | | | |
|---|---|---|---|---|
| 2008/0098046 | A1* | 4/2008 | Alpern | G06F 17/30306 707/E17.007 |
| 2008/0222616 | A1* | 9/2008 | Cheng | G06F 8/51 717/137 |
| 2009/0037446 | A1* | 2/2009 | Tonev | G06F 17/30917 707/E17.005 |
| 2009/0037455 | A1* | 2/2009 | Doney | G06F 17/30297 707/E17.044 |
| 2009/0049065 | A1* | 2/2009 | Weissman | G06F 8/70 707/E17.044 |
| 2009/0150396 | A1* | 6/2009 | Elisha | G06F 17/3051 707/E17.055 |
| 2009/0259683 | A1* | 10/2009 | Murty | G06F 17/30607 707/E17.014 |
| 2009/0313608 | A1* | 12/2009 | Sharma | G06F 8/38 707/E17.005 |
| 2010/0077380 | A1* | 3/2010 | Baker | G06F 8/72 717/120 |
| 2010/0153862 | A1* | 6/2010 | Schreiber | G06F 9/4448 707/802 |
| 2011/0208785 | A1* | 8/2011 | Burke | G06F 8/00 707/803 |
| 2012/0036165 | A1* | 2/2012 | Driesen | G06F 17/30286 707/803 |
| 2012/0036166 | A1* | 2/2012 | Qiu | G06F 17/30297 707/803 |
| 2014/0101644 | A1* | 4/2014 | Buzaski | G06F 17/30174 707/609 |
| 2015/0169757 | A1* | 6/2015 | Kalantzis | G06F 17/30569 707/722 |
| 2015/0227533 | A1* | 8/2015 | Goldstein | G06F 17/30377 707/661 |
| 2015/0227589 | A1* | 8/2015 | Chakrabarti | G06F 17/30507 707/748 |
| 2016/0055546 | A1* | 2/2016 | Chan | G06Q 30/0277 705/14.73 |
| 2016/0105863 | A1* | 4/2016 | Li | H04J 11/00 370/330 |
| 2016/0154829 | A1* | 6/2016 | Schrum | G06F 17/30371 707/703 |
| 2016/0179850 | A1* | 6/2016 | Martin | G06F 17/30584 707/634 |
| 2016/0299916 | A1* | 10/2016 | Prasanna | G06F 17/30162 707/609 |

* cited by examiner

PRESERVING DEPRECATED DATABASE COLUMNS

BACKGROUND

Many enterprise applications are communicatively coupled to a database for storing and manipulating large amounts of data. Throughout the lifecycle of the software applications, numerous upgrades, patches, and versioning changes may be applied. With each of these changes to the applications, the schema structure of the database may change. This may involve adding or removing columns of data.

BRIEF SUMMARY

In one embodiment, a method of preserving deprecated database columns across application upgrades may be presented. The method may include maintaining a database communicatively coupled to an application. The application may include a first schema. The first schema may indicate a first column for the database. The method may also include receiving an update for the application. The update may include a second schema that removes the first column from the database. The method may additionally include renaming the first column by appending a prefix to a name of the first column. The prefix may indicate that the first column is deprecated. The method may further include maintaining the first column in the database.

In another embodiment, a non-transitory computer-readable medium may be presented. The computer-readable memory may comprise instructions that, when executed by one or more processors, cause the one or more processors to perform operations including maintaining a database communicatively coupled to an application. The application may include a first schema. The first schema may indicate a first column for the database. The operations may also include receiving an update for the application. The update may include a second schema that removes the first column from the database. The operations may additionally include renaming the first column by appending a prefix to a name of the first column. The prefix may indicate that the first column is deprecated. The operations may further include maintaining the first column in the database.

In yet another embodiment, a system may be presented. The system may include one or more processors and a one or more memory devices including instructions that, when executed by the one or more processors, cause the one or more processors to perform operations including maintaining a database communicatively coupled to an application. The application may include a first schema. The first schema may indicate a first column for the database. The operations may also include receiving an update for the application. The update may include a second schema that removes the first column from the database. The operations may additionally include renaming the first column by appending a prefix to a name of the first column. The prefix may indicate that the first column is deprecated. The operations may further include maintaining the first column in the database.

In various implementations of these embodiments, one or more of the following features may be included without limitation. The second schema may also add a second column to the database, and the method/operaionts may further include adding the second column to the database by appending a prefix to a name of the second column, where the prefix may indicate that the first column is a beta version, and maintaining the second column in the database. The method/operations may also include receiving a second update for the application, where the second update may include a third schema that does not remove the second column from the database, and maintaining the second column in the database by removing the prefix from the name of the second column. The prefix may not be allowed to be used by user-defined software packages. The prefix and the name of the first column may be separated by a "$" character. The method/operations may additionally include receiving a command to restore the first schema for the database, and restoring the first column in the database by removing the prefix from the name of the first column. The method/operations may further include receiving a second update for the application, where the second update does not restore the first column to the database, and deleting the first column from the database in response to receiving the second update. The method/operations may also include receiving a second update for the application, where the second update does not restore the first column to the database, and maintaining the first column in the database by removing the prefix from the name of the first column and replacing the prefix with a second prefix that refers to a user-defined software package.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
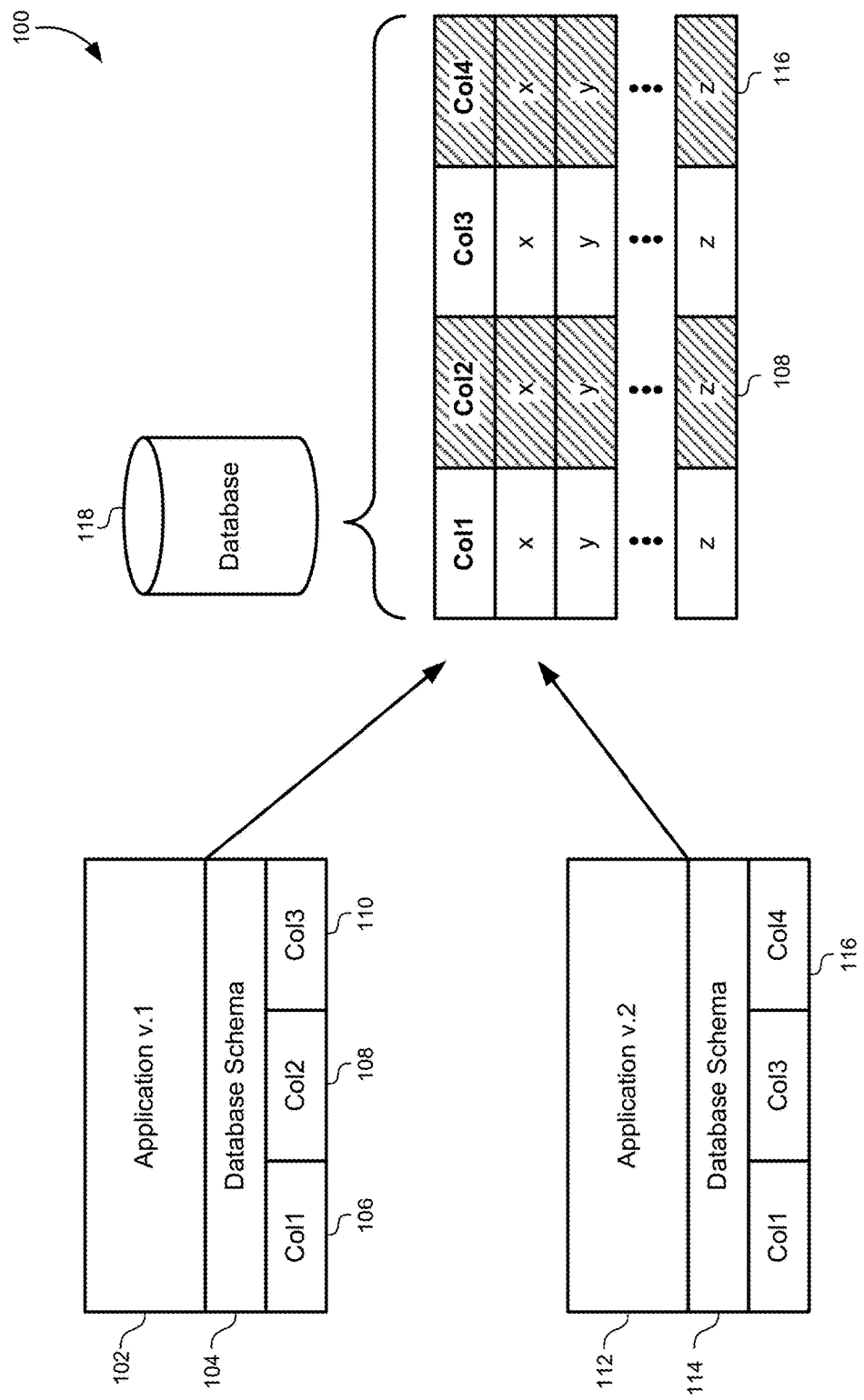
FIG. 1 illustrates a block diagram of an application coupled to a database receiving an update, according to some embodiments.

Described herein, are embodiments for adding and/or subtracting database information between schema changes associated with application upgrades. Application upgrades often change the schema of the database. Data that was used by a previous version of the application may not be necessary in later versions. Likewise, new data fields may be added as applications continue to evolve. As the software lifecycle of the application progresses, a schema definition for data stored in an associated database may be changed to reflect these data changes. The typical result is for data columns in a database to either be added or removed from the database when the application is upgraded.

When it is determined that information stored in a database column is no longer necessary for the operation of the product, a new database schema will often eliminate that column from the database. However, customers often desire to retain that information or at least have some means to migrate that data to another storage location without needing to perform time-consuming backup operations before and/or after the application upgrade is completed. In the past, customers had to be aware that data was going to be lost due to impending application updates and had to copy the data to another location before the update process began. This presented a number of difficulties because often the level of detail necessary to determine which data columns would be removed was not disclosed as part of the upgrade documentation. If a large amount of data was being removed from the database, creating these temporary backups also required significant storage space to duplicate database columns. Because of these and other difficulties, customers often simply suffered through the loss of data associated with application upgrades.

In the embodiments described herein, changes to the schema associated with an application can continue to alter the way data is stored in the database. However, instead of simply deleting or adding columns of data, some embodiments may maintain deprecated data columns in the database by renaming the database columns in such a way that ensures that data collisions are avoided and eliminates the costly duplication of data columns in auxiliary backup locations. Similarly, as columns are added to the database, they can be renamed using a reserved namespace prefix that allows them to be easily identified, made permanent, and/or deleted by the customer and/or the developer. By way of example, instead of deleting a data column, a data column can be renamed with a prefix to the existing column name, such as "DEPRECATED$OldColName", and a data column to be added would be inserted with a prefix and the new column name, such as "BETA$NewColName". These prefixes may correspond to reserved namespaces that are not used by either user packages or existing developer packages. Over time, columns in the deprecated namespace can be deleted or permanently migrated to a user-package namespace, and columns in the beta namespace can be deleted or migrated into the developer namespace (e.g., removing the prefix altogether).

FIG. 1 illustrates a block diagram of an application coupled to a database receiving an update, according to some embodiments. A first version of application 102 may include a first database schema 104 that defines a plurality of data fields represented as columns 106, 108, 110 in an associated database 118. As used herein, a "schema" refers to a database schema, or a structure described in a formal language supported by a database management system or an organizational blueprint of how the database is constructed, divided into tables, and so forth. In some embodiments, the schema may simply be a formal definition of how data is stored in columns in tables in the database. Therefore, the first database schema 104 may include a definition that dictates data to be stored in column 106, column 108, and/or column 110. Each of these columns may include the same type of data for various records in the database (e.g. x, y, z). By way of example, column 106 may store a Social Security number for students in a student record database.

Periodically, the application 102 may receive various updates. As used herein, the term "update" may refer to any patch, security patch, module replacement, software upgrade, data upgrade, or any other type of change made to the application 102. By way of example, a developer of the application can distribute a patch that addresses known security issues. In another example, a user may purchase a new version of the application that is installed as replacement to a previous version of the application. In any of these update scenarios, data within the database 118 may be changed according to a change in the schema. In FIG. 1, a second version of the application 112 may result from any type of update, and may include a second database schema 114. It will be understood that the second database schema 114 may make many changes to the way that data is stored in the database 118. In this simplified example, the second database schema 114 eliminates column 108 from the database 118 and adds column 116 to the database 118.

Prior to this disclosure, upgrading the schema would require columns in the database 118 to be removed and either permanently deleted or stored in another location. In contrast, the embodiments herein maintain the data that is changed in the database 118 by renaming the column names. Therefore, column 108 will be maintained in the database 118, and column 116 will be added to the database with prefixes that indicate their status as either deprecated or beta.

Renaming the columns may take many different forms depending on the embodiments. In one exemplary embodiment, a naming convention compatible with MySQL databases is used for illustrative purposes only. To be compatible with MySQL syntax, a prefix may be placed before a "$" (dollar sign) in order to indicate that the column name following the "$" is part of the prefix namespace.

Figure 2:
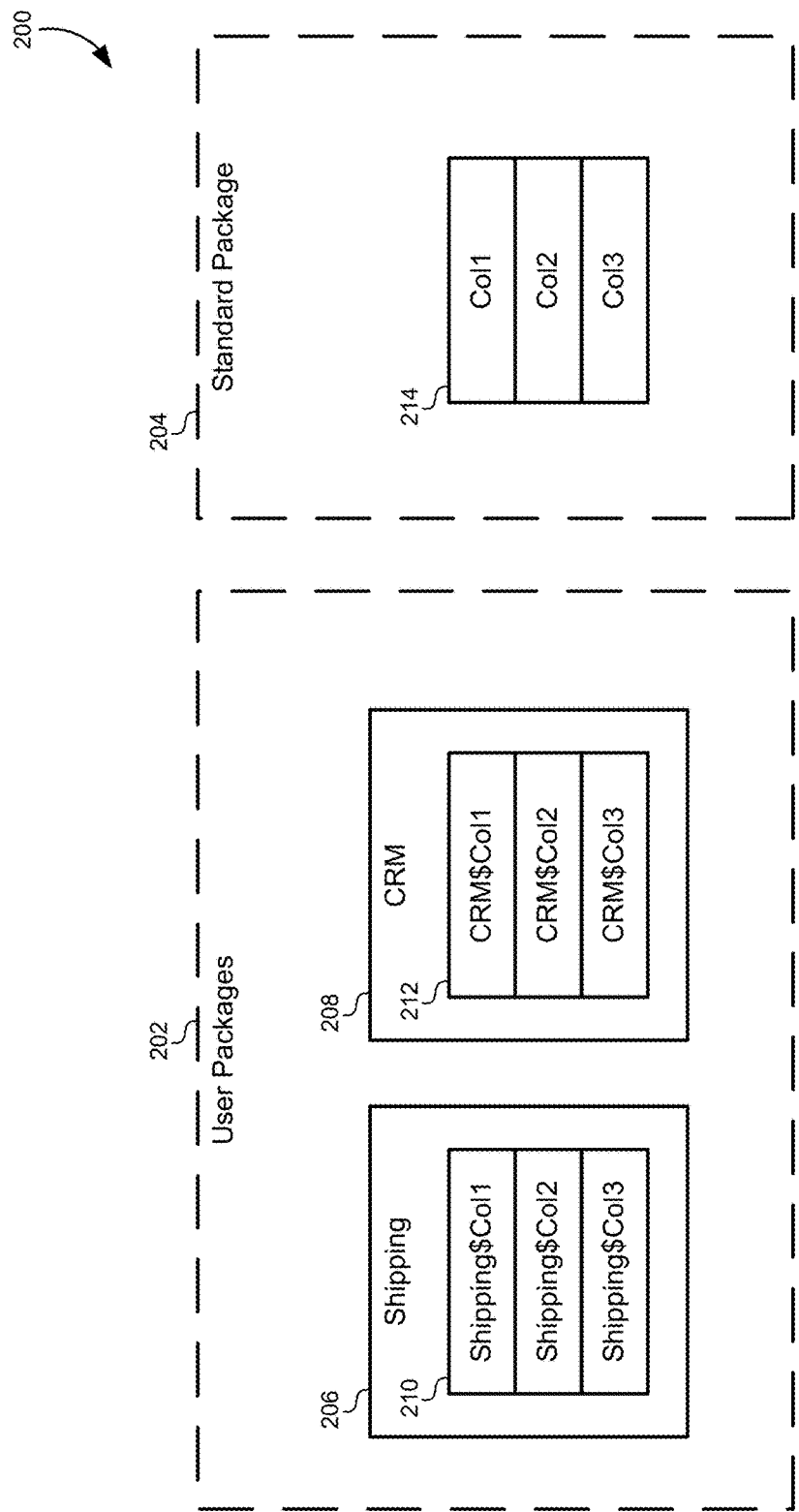
FIG. 2 illustrates one way of renaming columns in a database with prefixes, according to some embodiments.

FIG. 2 illustrates one way of renaming columns in a database with prefixes, according to some embodiments. In these embodiments, prefix names may denote namespaces corresponding to software packages. Typically, when a developer distributes an application with the database, column names within the database will not have prefix. Instead, columns 214 in the original software package will simply be referred to as a column name (e.g., LastName, StudentNo, Address, etc.). These original columns 214 are part of what will be referred to herein as a standard package 204.

After a software product with the database has been made available to a customer, the customer may wish to add functionality to the software product by creating custom plug-ins, modules, and/or the like. These customizations may require additional data fields in addition to those provided by the schema of the standard package 204. Therefore, some embodiments may allow users to create user-specific software packages. These user packages 202 may include various namespaces that can be appended as prefixes to the column names of the newly added data columns. By way of example, FIG. 2 illustrates a shipping namespace 206 with new shipping columns 210 in that namespace. Additionally, FIG. 2 illustrates a CRM namespace 208 with new CRM columns 212 in that namespace. Note that the name of each column (e.g. "Col1", "Col2", etc.) is the same, however data collisions are avoided by the use of the namespace prefixes. Therefore, the application can interpret "Shipping$Col1" as being a different column than "Col1".

Figure 3:
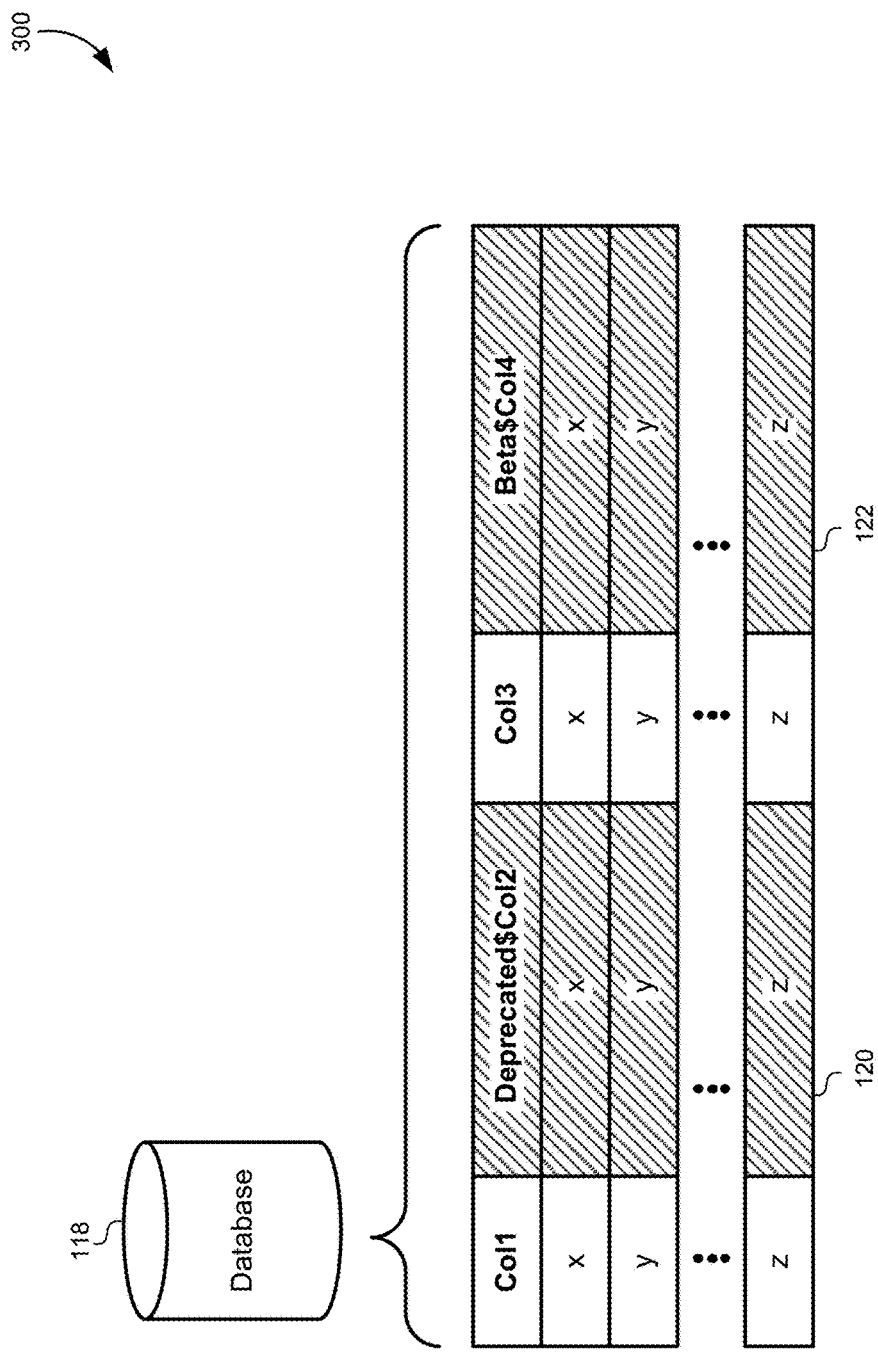
FIG. 3 illustrates an updated database with prefix renaming, according to some embodiments.

FIG. 3 illustrates an updated database with prefix renaming, according to some embodiments. As described in relation to FIG. 1, new columns can be added to the database with a prefix that indicates that this column is a newly added column, possibly of a temporary nature, that may need to be removed and/or made permanent during a subsequent software upgrade. Any naming convention may be used so long as it does not conflict with any existing software package namespace. By way of example, the embodiments described herein will use the term "BETA" as a namespace reserved for newly added columns resulting from the software update.

In similar fashion, data that is removed from the database can be maintained instead of being deleted. The deprecated status of such columns can be indicated by using a column prefix that indicates that the column is no longer part of the standard software package of the new software version. Again, any naming convention may be used so long as it does not conflict with any existing software package namespace. By way of example, the embodiments described herein will use the term "DEPRECATED" as a namespace reserved for columns that have been deleted by a software update. This prefix can simultaneously allow the software to ignore the deprecated data column and also easily identify the deprecated data column to a user wishing to preserve the data column rather than delete it permanently.

Figure 4:
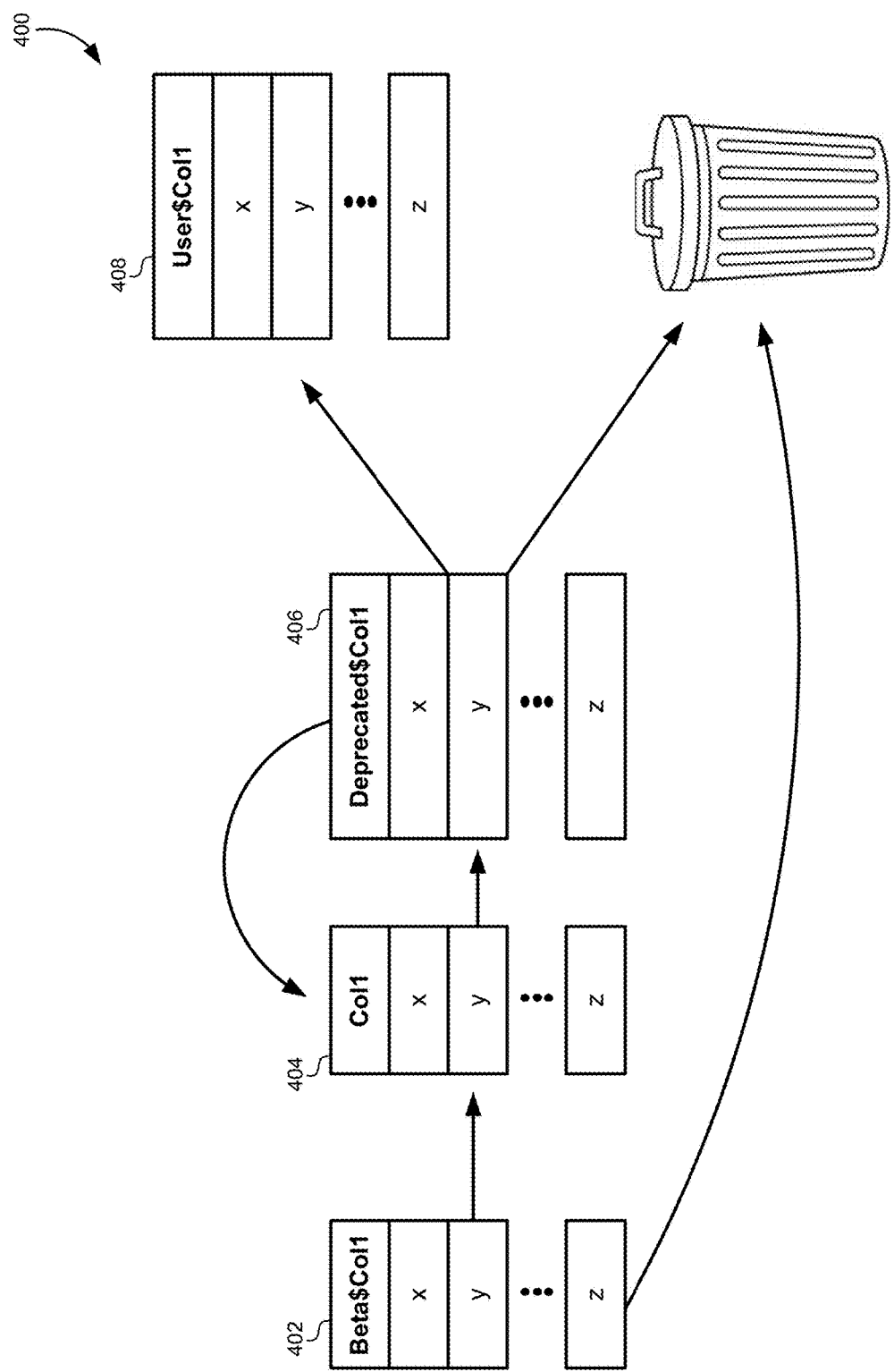
FIG. 4 illustrates a block diagram of a column lifecycle through various schema upgrades, according to some embodiments.

FIG. 4 illustrates a block diagram of a column lifecycle through various schema upgrades, according to some embodiments. When a column is initially added to a schema, it may be done so on a temporary basis. For example, a beta version of a certain application feature may be included in an application upgrade, and the beta version may include additional data columns that were not previously present in the database. Such columns may be added as a beta column 402, and may be considered a temporary or provisional part of the database. The data column 402 will exist in the database the same as any other database column, the exception being that the name will be prefixed using a prefix that indicates its beta status.

In order to transition from beta status to regular status, the beta column 402 can simply have the beta prefix removed. This transition may take place at different times according to different embodiments. In some embodiments, the beta prefix may be removed automatically after a predetermined amount of time. For example, new columns may be added with a beta prefix for 60 days, 90 days, or any other trial interval. At the expiration of the trial interval, the beta status of the beta column 402 may be removed. In some embodiments, subsequent upgrades to the software and/or database schema may also trigger removal of a column's beta status prefix. For example, a first application upgrade may add the beta column 402. A subsequent application upgrade may automatically remove the beta prefix from the existing beta column 402 in order to allow new beta columns to be added without confusion. In some embodiments, a beta version prefix may also be used that indicates the number of software updates since the beta column 402 was added. The beta version prefix can be incremented with each software update and finally removed after a predetermined number of software updates. For example, beta column 402 could be renamed as "Beta1$Col1" after a second upgrade, and renamed "Beta2$Col1" after a third upgrade. After these two subsequent upgrades, a third upgrade could remove the beta prefix from the beta column 402 altogether. Other embodiments may use different criteria when removing a beta prefix, such as waiting for the software update to reach a predetermined level of stability that can be measured by a bug/error reporting rate below a predetermined threshold, and so forth.

The beta column 402 can transition to a regular column 404 through the process described above. However, the beta column 402 can also be discarded if the beta-portion of the software application is not given a more permanent status. In some embodiments, a second application upgrade may remove the beta-portion of the software added in a previous software upgrade. This may automatically trigger a process that searches the database for columns with the beta prefix and remove these columns from the database entirely. Alternatively, instead of deleting the beta column 402 when it is not given more permanent status, the beta column 402 could be transitioned to a deprecated column status with a corresponding prefix or a user-package prefix.

The regular column 404 may be transitioned to a deprecated column 406 as described above as a result of a software update. In some cases, the deprecated column 406 may be transitioned back to a regular column 404 by simply removing the deprecated prefix. For example, a subsequent software update may restore a software feature that was previously removed. Oftentimes, customers object after popular software features have been removed from software upgrades. By using the deprecated prefix, software developers can restore previously removed software features without having to copy data back into the database from archival backup copies.

In some embodiments, both the deprecated and beta prefixes can include additional information that ties the column to a particular software update. This can allow deprecated/beta columns from different software updates to coexist in the database while remaining distinguishable. For example, when updating a software version from v.1.1 to v.1.2 and then later to v.2.0, beta columns may be added such as "Beta.v.1.2$Col1" and "Beta.v.2.0$Col1". Similarly, columns removed when transitioning between software updates can include deprecated prefixes, such as "Depricated.v.1.2$Col1". Versioning of beta/deprecated prefixes can allow future software updates to transition columns between beta, regular, and deprecated status according to versions. For example, a software update may indicate to users that a certain software feature is being transitioned out of use and limited support may be provided during a transition interval. This first software update can transition columns to a deprecated status that allows for limited use and/or support. After three subsequent software updates, the process can determine that software feature can be permanently removed and the deprecated columns associated with the first software update can then be removed while leaving deprecated columns associated with other software updates intact.

A deprecated column 406 can be restored as a regular column 404 by removing the deprecated prefix. Alternatively, the deprecated column 406 can transition to being a user-package column 408 by substituting the deprecated prefix for a prefix associated with a particular user package. This allows users to create their own archival backups of deprecated columns instead of deleting them entirely.

Figure 5:
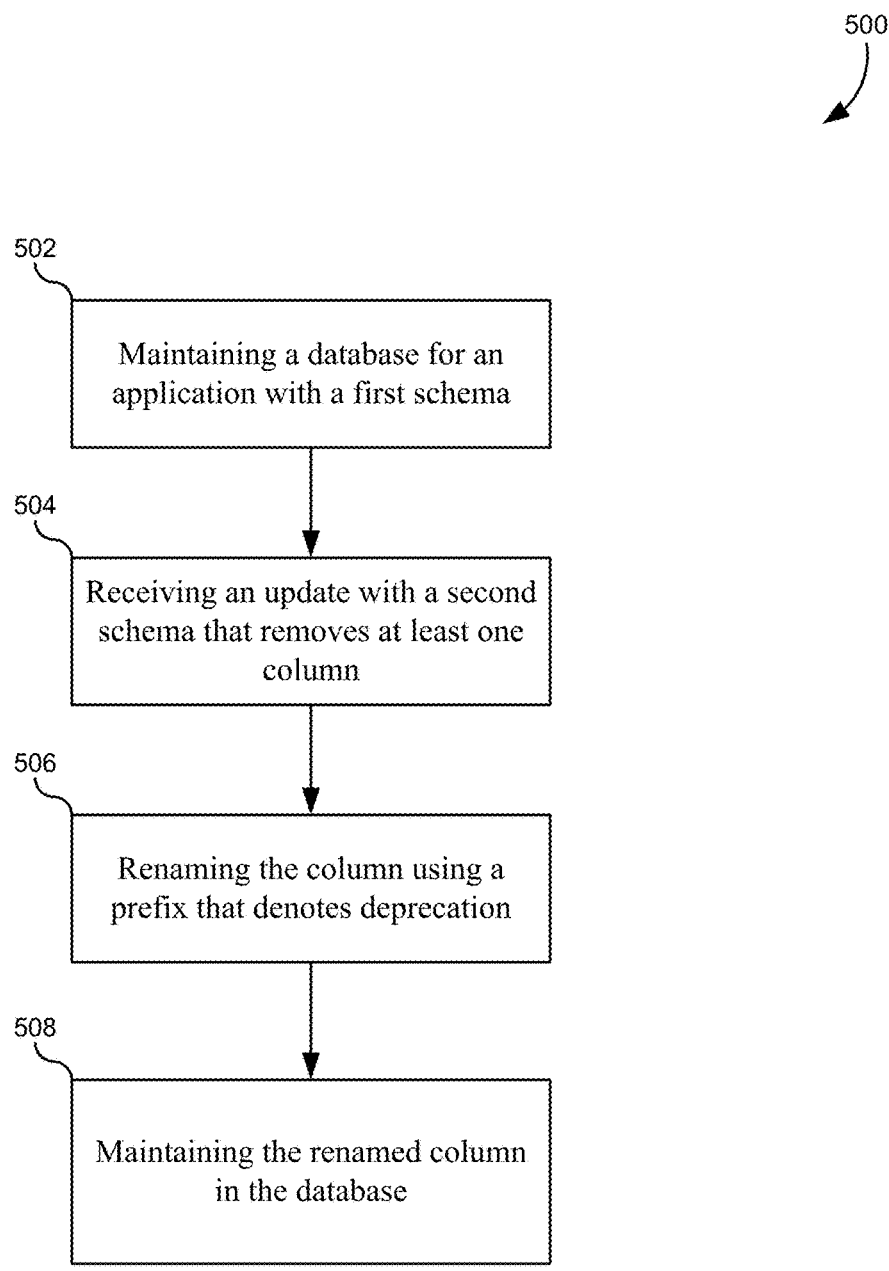
FIG. 5 illustrates a method of deprecating a column in a database, according to some embodiments.

FIG. 5 illustrates a method of deprecating a column in a database, according to some embodiments. The method may include maintaining a database for an application (502). The application may be associated with a first schema for the database. The database may be communicatively coupled to the application through a database manager. For example, the application may be a web service that accesses data stored in a central database. The first schema can define a plurality of columns in various tables stored within the database. The method may also include receiving an update for the application (504). The update may include a second schema that differs from the first schema. For example, the second schema may remove a first column from the database that was part of the first schema. The method may further include renaming a removed column using a prefix that the notes deprecation (506). The prefix may simply be added to an existing column name separated by an identifier that is recognized by the database language as separating prefixes from column names. In some embodiments, a prefix such as "deprecated" may be used. Other embodiments may use application-specific prefixes that indicate to an application that the column is deprecated. The prefix may be restricted such that user-defined software packages are not allowed to use the prefix and such that it is not confused with the regular software package of the application. Some embodiments may include versioning information in the prefix. The process may also include maintaining the renamed column in the database (508). In some embodiments, this means that the only change to the data column is the prefix added to the name. Some embodiments may also transition deprecated columns to a special deprecated table for easy identification.

Figure 6:
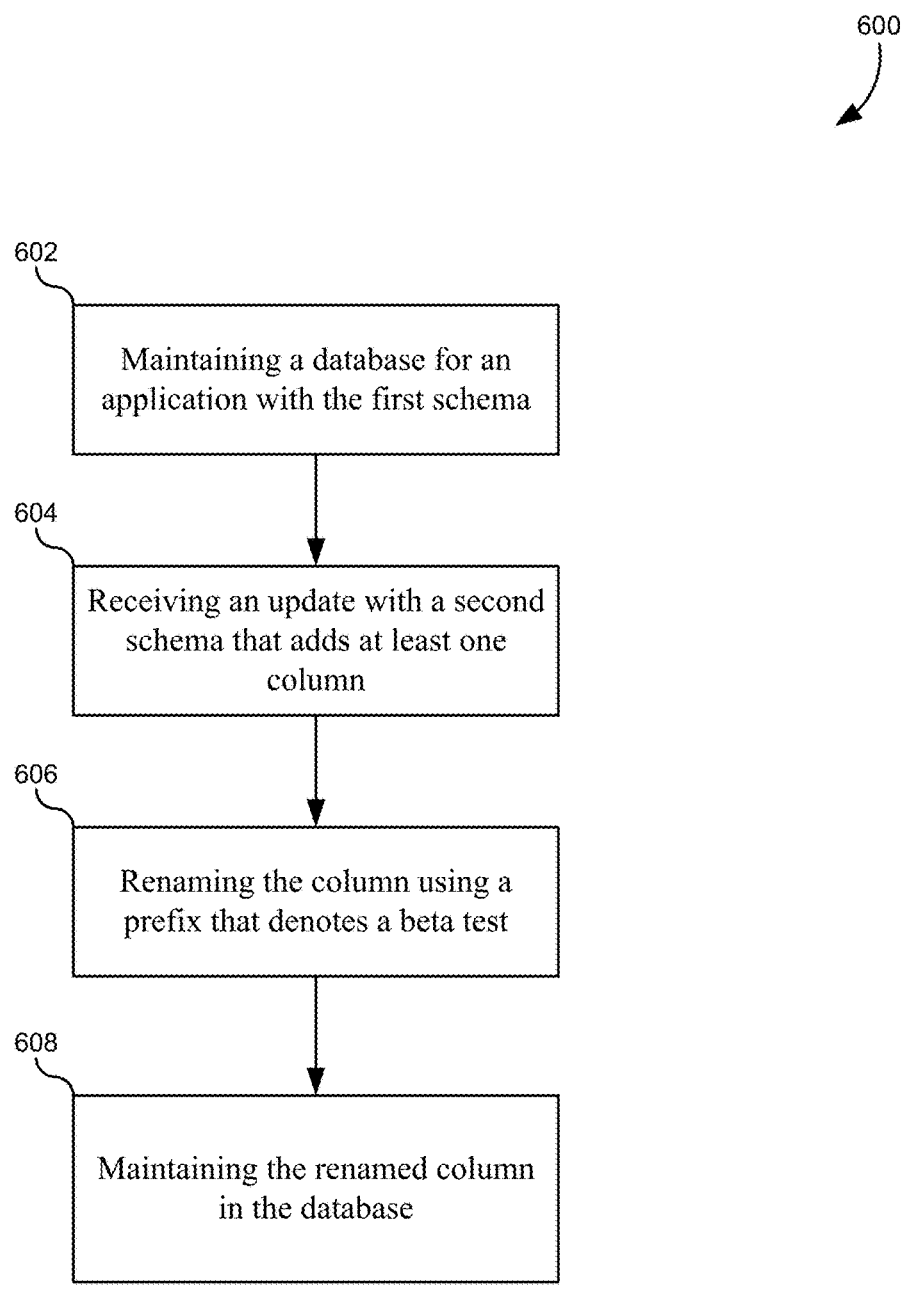
FIG. 6 illustrates a method of adding a column during a beta test of a database, according to some embodiments.

FIG. 6 illustrates a method of adding a column during a beta test of a database, according to some embodiments. This method is similar to the method for deprecating a column described above in relation to FIG. 5. The method may include maintaining the database with the first schema (602) and receiving an update with a second schema (604). In this case, the second schema can add at least one column to the database. The method may include renaming the added column using a prefix that indicates its beta status (606). Some embodiments need not rename the column per se, but can instead include storing the column with the beta prefix as provided by the software update. For example, a software update may arrive with the beta prefix already added to any new columns for the database. As described above, the method may then include maintaining the renamed column in the database (608). In some embodiments, subsequent updates to the software can automatically transition the beta column to become a regular column by removing the beta indicator from the prefix.

Figure 7:
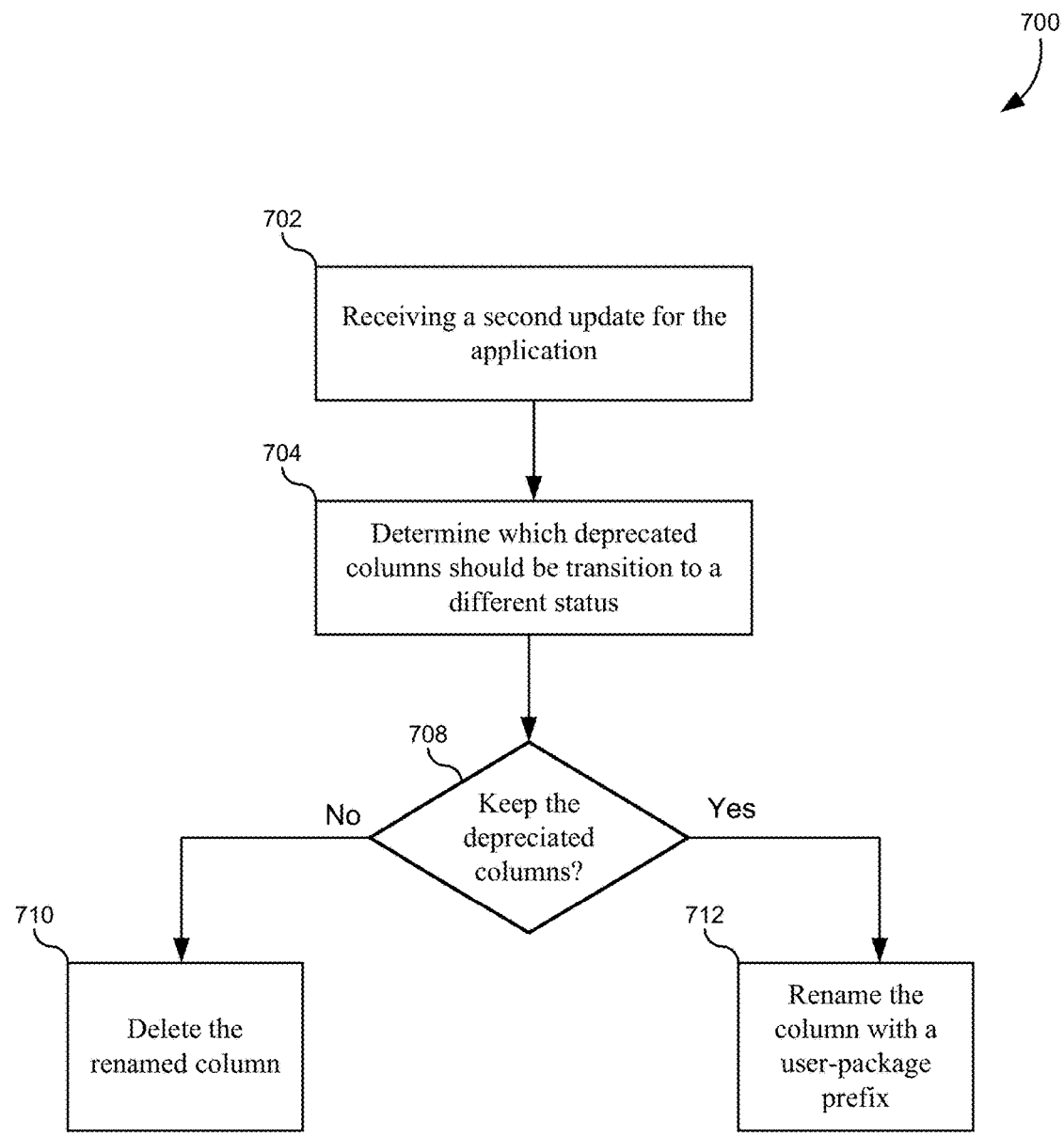
FIG. 7 illustrates a method of moving a database column beyond its deprecated status, according to some embodiments.

FIG. 7 illustrates a method of moving a database column beyond its deprecated status, according to some embodiments. The method may include receiving a second update for the application (702). The second update for the application can include an indication that a previously deprecated column should be removed. In some embodiments, the second update of the application can specifically indicate particular deprecated columns that should be removed (e.g. columns deprecated by a specific previous software update version). Alternatively or additionally, the second update can automatically remove deprecated columns that were deprecated a predetermined number of versions ago (e.g. columns deprecated at least two software updates ago). Therefore, the method may include determining particular deprecated columns to transition to a new status (704).

Deprecated columns can be transitioned back to a regular column status by removing the prefix, deleting them from the database (710), and/or transitioning them to a user-software package by changing the prefix (712). The decision (708) can be made automatically or set by user preference. For example, part of an update procedure may present users with the option to maintain the columns' deprecated status, and/or transition columns to a user-defined software package. Users may also establish preferences that can be provided to the update process. Alternatively or additionally, some software updates may include instructions that instruct the update process to remove columns, deprecate columns, maintain the deprecated status of columns, and/or transition columns to user-defined software packages.

It should be appreciated that the specific steps illustrated in FIGS. 5-7 provide particular methods of adding/removing database columns in response to software upgrades according to various embodiments of the present invention. Other sequences of steps may also be performed according to alternative embodiments. For example, alternative embodiments of the present invention may perform the steps outlined above in a different order. Moreover, the individual steps illustrated in FIGS. 5-7 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
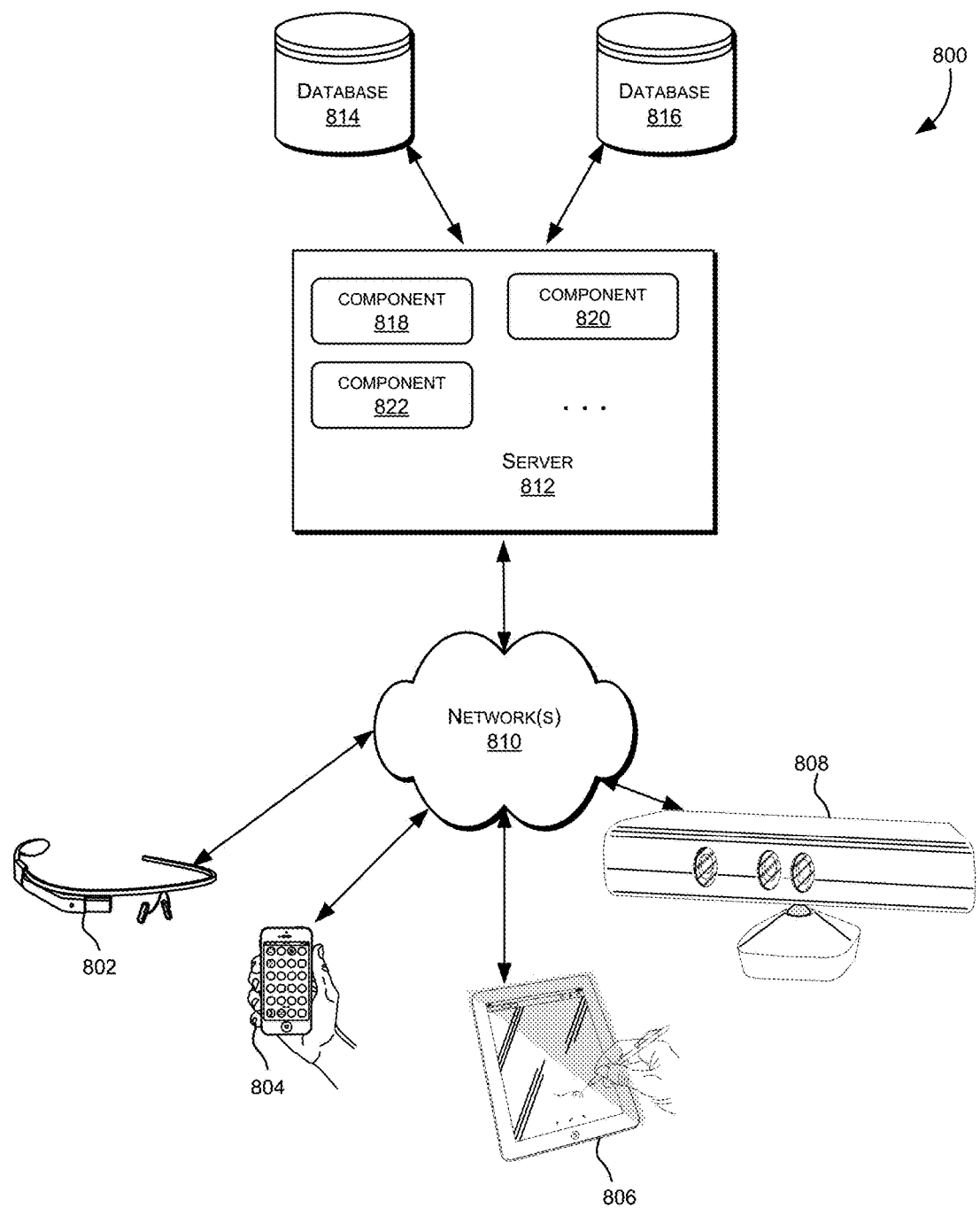
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
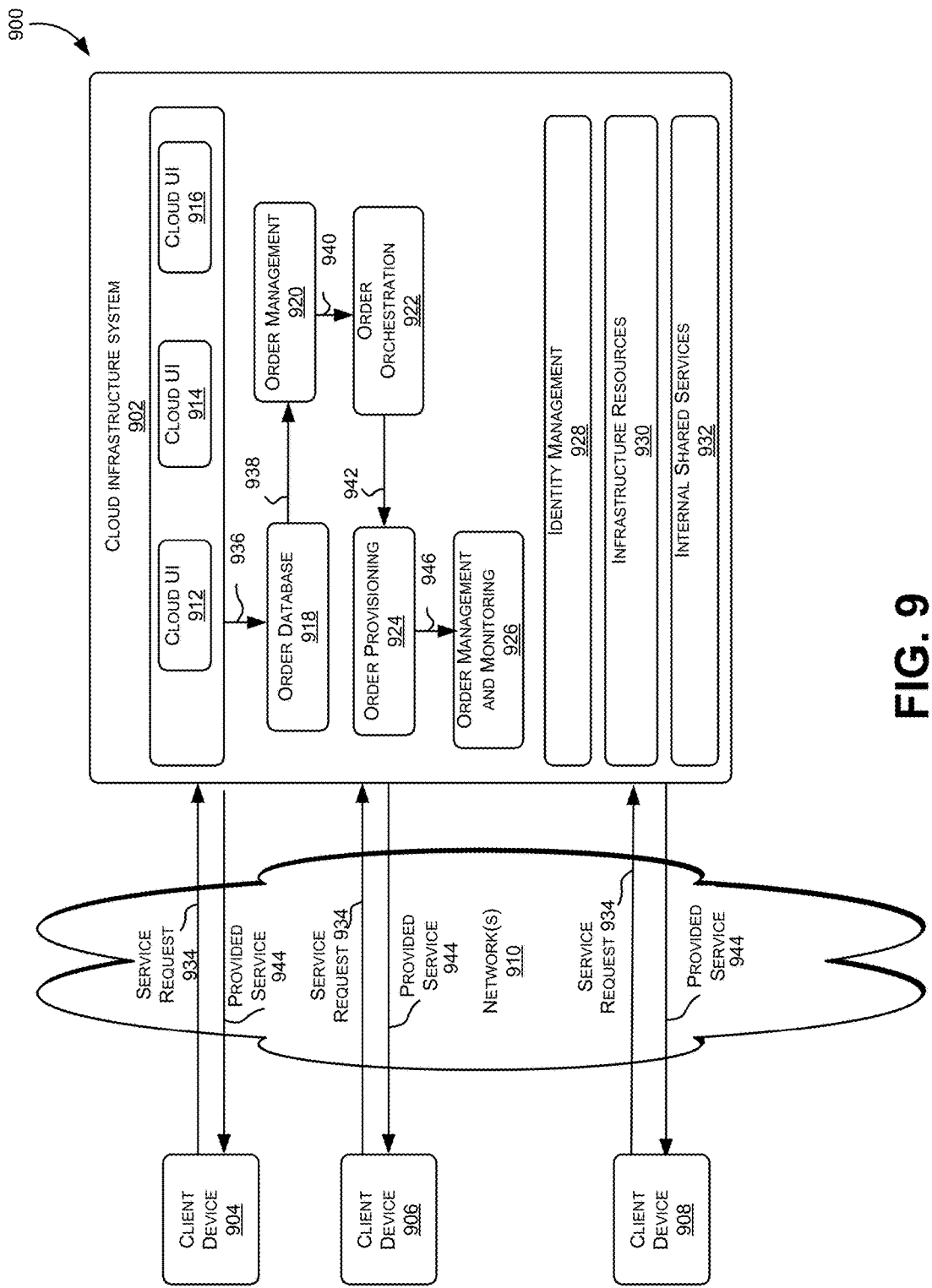
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
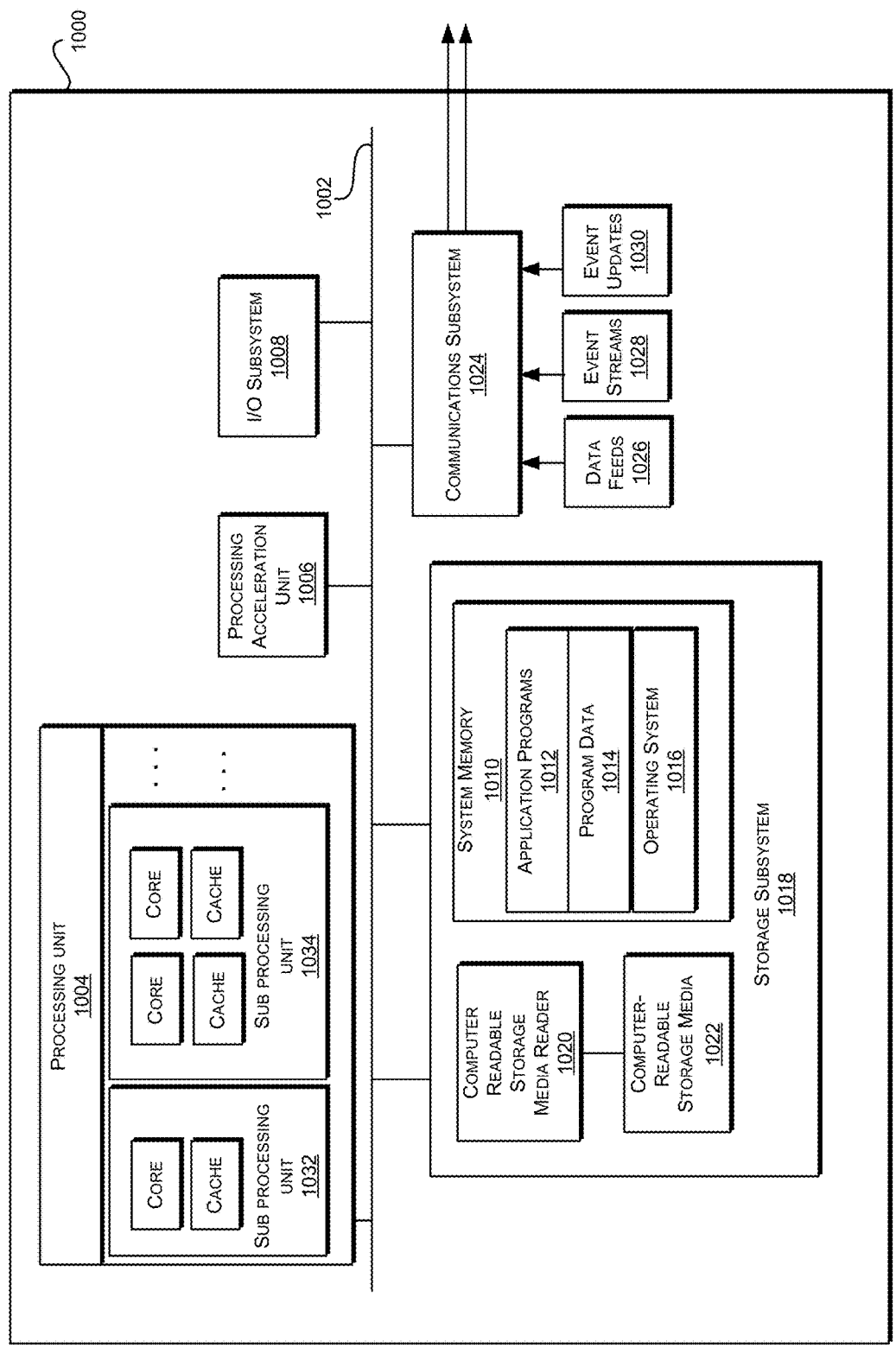
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of preserving deprecated database columns across application upgrades, the method comprising:
   maintaining a database communicatively coupled to an application, wherein the application includes a first schema, the first schema indicating a first column for the database;
   receiving an update for the application, wherein the update includes a second schema that removes the first column from the database;
   renaming the first column by appending a prefix to a name of the first column, wherein the prefix indicates that the first column is deprecated;
   maintaining the first column in the database after the second schema has replaced the first schema by recognizing the prefix to the name of the first column; and
   writing data from the application with the second schema to columns in the database other than the first column.

2. The method of claim 1 wherein the second schema also adds a second column to the database, the method further comprising:
   adding the second column to the database by appending a prefix to a name of the second column, wherein the prefix indicates that the first column is a beta version; and
   maintaining the second column in the database.

3. The method of claim 2 further comprising:
   receiving a second update for the application, wherein the second update includes a third schema that does not remove the second column from the database; and maintaining the second column in the database by removing the prefix from the name of the second column.

4. The method of claim 1 wherein the prefix is not allowed to be used by user-defined software packages.

5. The method of claim 1 wherein the prefix and the name of the first column are separated by a "$" character.

6. The method of claim 1 further comprising:
receiving a command to restore the first schema for the database; and
restoring the first column in the database by removing the prefix from the name of the first column.

7. The method of claim 1 further comprising:
receiving a second update for the application, wherein the second update does not restore the first column to the database; and
deleting the first column from the database in response to receiving the second update.

8. The method of claim 1 further comprising:
receiving a second update for the application, wherein the second update does not restore the first column to the database; and
maintaining the first column in the database by removing the prefix from the name of the first column and replacing the prefix with a second prefix that refers to a user-defined software package.

9. A non-transitory, computer-readable medium comprising instructions which, when executed by one or more processors, cause the one or more processors to perform operations comprising:
maintaining a database communicatively coupled to an application, wherein the application includes a first schema, the first schema indicating a first column for the database;
receiving an update for the application, wherein the update includes a second schema that removes the first column from the database;
renaming the first column by appending a prefix to a name of the first column, wherein the prefix indicates that the first column is deprecated;
maintaining the first column in the database after the second schema has replaced the first schema by recognizing the prefix to the name of the first column; and
writing data from the application with the second schema to columns in the database other than the first column.

10. The non-transitory computer-readable memory according to claim 9 wherein the second schema also adds a second column to the database, and wherein the instructions further cause the one or more processors to perform operations comprising:
adding the second column to the database by appending a prefix to a name of the second column, wherein the prefix indicates that the first column is a beta version; and
maintaining the second column in the database.

11. The non-transitory computer-readable medium according to claim 10 wherein the instructions cause the one or more processors to perform additional operations comprising:
receiving a second update for the application, wherein the second update includes a third schema that does not remove the second column from the database; and
maintaining the second column in the database by removing the prefix from the name of the second column.

12. The non-transitory computer-readable memory according to claim 9 wherein the prefix is not allowed to be used by user-defined software packages.

13. The non-transitory computer-readable medium according to claim 9 wherein the instructions cause the one or more processors to perform additional operations comprising:
receiving a command to restore the first schema for the database; and
restoring the first column in the database by removing the prefix from the name of the first column.

14. The non-transitory computer-readable medium according to claim 9 wherein the instructions cause the one or more processors to perform additional operations comprising:
receiving a second update for the application, wherein the second update does not restore the first column to the database; and
deleting the first column from the database in response to receiving the second update.

15. The non-transitory computer-readable medium according to claim 9 wherein the instructions cause the one or more processors to perform additional operations comprising:
receiving a second update for the application, wherein the second update does not restore the first column to the database; and
maintaining the first column in the database by removing the prefix from the name of the first column and replacing the prefix with a second prefix that refers to a user-defined software package.

16. A system comprising:
one or more processors; and
one or more memory devices comprising instructions which, when executed by the one or more processors, cause the one or more processors to perform operations comprising:
maintaining a database communicatively coupled to an application, wherein the application includes a first schema, the first schema indicating a first column for the database;
receiving an update for the application, wherein the update includes a second schema that removes the first column from the database;
renaming the first column by appending a prefix to a name of the first column, wherein the prefix indicates that the first column is deprecated;
maintaining the first column in the database after the second schema has replaced the first schema by recognizing the prefix to the name of the first column; and
writing data from the application with the second schema to columns in the database other than the first column.

17. The system of claim 16 wherein the second schema also adds a second column to the database, and wherein the instructions further cause the one or more processors to perform operations comprising:
adding the second column to the database by appending a prefix to a name of the second column, wherein the prefix indicates that the first column is a beta version; and
maintaining the second column in the database.

18. The system of claim 17 wherein the instructions further cause the one or more processors to perform additional operations comprising:
receiving a second update for the application, wherein the second update includes a third schema that does not remove the second column from the database; and maintaining the second column in the database by removing the prefix from the name of the second column.

19. The system of claim 16 wherein the instructions further cause the one or more processors to perform additional operations comprising:

receiving a command to restore the first schema for the database; and restoring the first column in the database by removing the prefix from the name of the first column.

20. The system of claim 16 wherein the instructions further cause the one or more processors to perform additional operations comprising:

receiving a second update for the application, wherein the second update does not restore the first column to the database; and maintaining the first column in the database by removing the prefix from the name of the first column and replacing the prefix with a second prefix that refers to a user-defined software package.

* * * * *

UNITED STATES PATENT AND TRADEMARK OFFICE
CERTIFICATE OF CORRECTION

PATENT NO. : 9,898,488 B2
APPLICATION NO. : 14/557085
DATED : February 20, 2018
INVENTOR(S) : Schrum Page 1 of 1

It is certified that error appears in the above-identified patent and that said Letters Patent is hereby corrected as shown below:

In the Specification

In Column 1, Line 63, delete "method/operaionts" and insert -- methods/operations --, therefor.

In the Claims

In Column 21, Line 46, in Claim 10, delete "memory" and insert -- medium --, therefor.

In Column 21, Line 65, in Claim 12, delete "memory" and insert -- medium --, therefor.

Signed and Sealed this
Twenty-ninth Day of December, 2020

Andrei Iancu
*Director of the United States Patent and Trademark Office*